Figure 1:
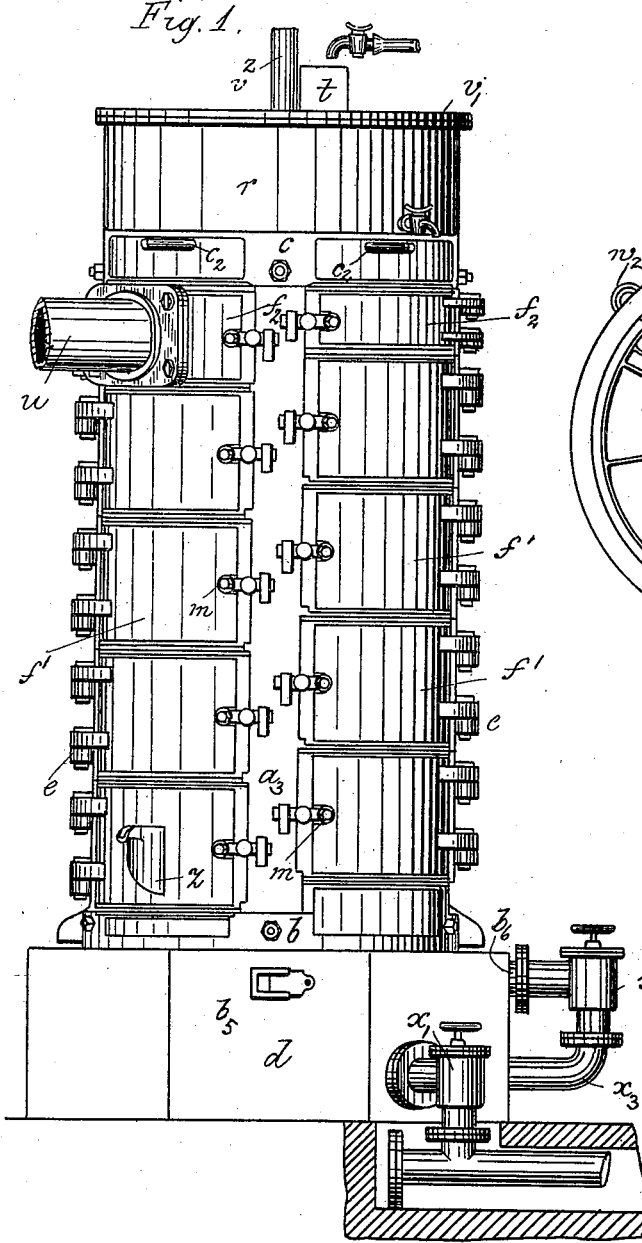

No. 627,749.  
O. GUTTMANN.  
APPARATUS FOR CONCENTRATING ACIDS.  
(Application filed Mar. 7, 1899.)  
(No Model.)  
Patented June 27, 1899.  
2 Sheets—Sheet 1.

Witnesses  
Inventor  
Oscar Guttmann  
per Attorney

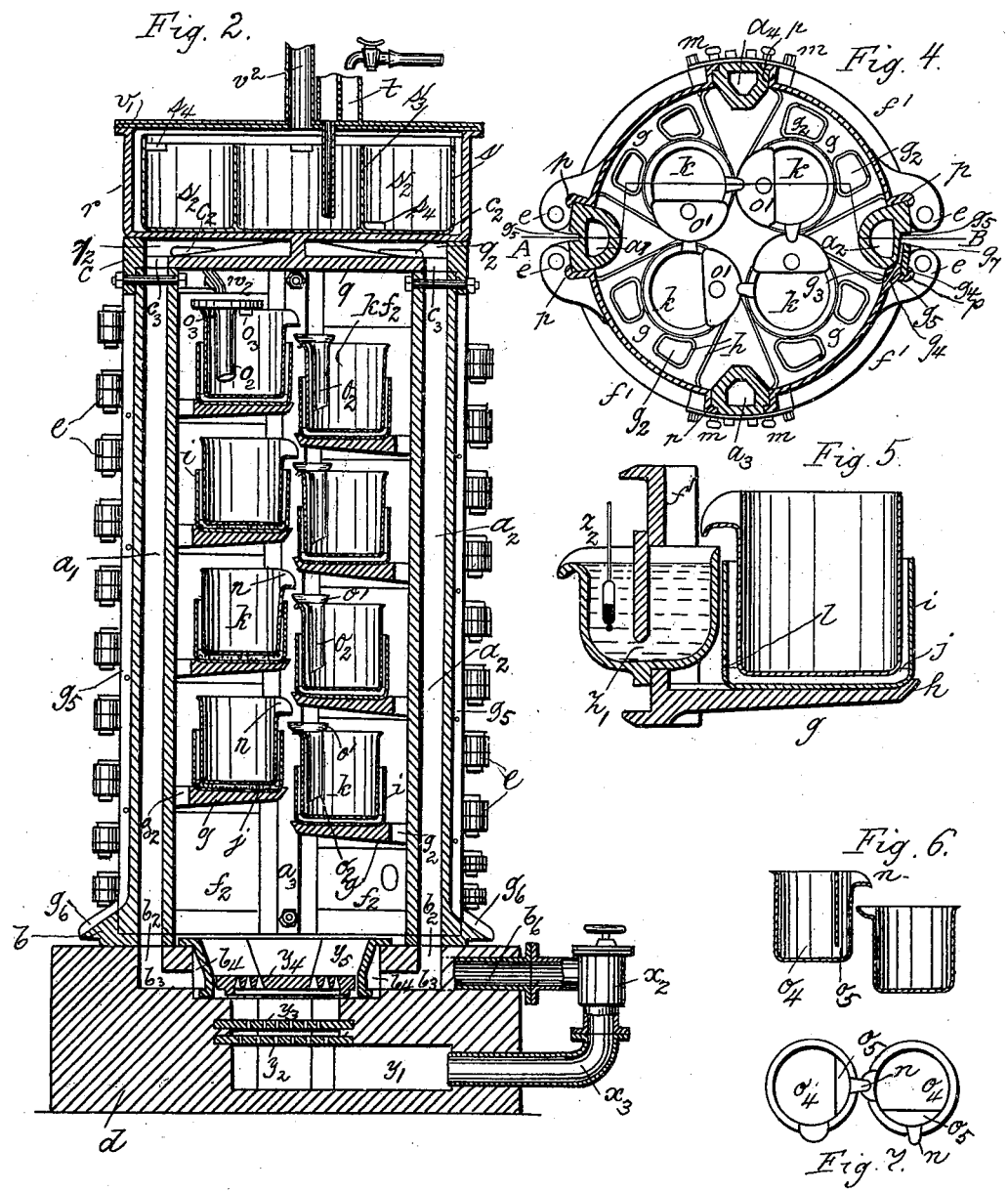

UNITED STATES PATENT OFFICE.

OSCAR GUTTMANN, OF LONDON, ENGLAND.

APPARATUS FOR CONCENTRATING ACIDS.

SPECIFICATION forming part of Letters Patent No. 627,749, dated June 27, 1899.

Application filed March 7, 1899. Serial No. 708,102. (No model.)

*To all whom it may concern:*

Be it known that I, OSCAR GUTTMANN, consulting engineer and chemical adviser, a subject of the Queen of England, residing at 12 Mark Lane, in the city of London, E. C., England, have invented a new and useful Apparatus for the Concentration of Sulfuric Acid and other Liquids by Evaporation, of which the following is a specification.

My invention relates to improvements in apparatus for the concentration by evaporation of sulfuric acid and other mineral acids and liquids which are capable of being concentrated by means of heat applied to the exterior of the vessels in which the acid or other liquid is contained and to the surface of the liquid undergoing evaporation. The concentration of such liquids has hitherto been frequently effected by the well-known method of arranging a series of open evaporating vessels of glass, porcelain, or similar material in a row, such vessels being placed in steps, so that the upper part of one vessel in the series is slightly above that of the next vessel in the series. The liquid undergoing evaporation is run into the upper vessel of the series and conducted therefrom by a spout into the next lower vessel of the series through a pipe or funnel dipping some distance below the level of the liquid in the lower vessel, thus causing the less concentrated liquid coming from the upper vessel to rise through the more concentrated liquid in the lower vessel, and so on through the series of vessels. Sometimes these vessels have a flat or semicircular vertical partition which reaches nearly to the bottom of the vessel, and the liquid undergoing evaporation runs direct from one compartment of the upper vessel into the other compartment of the lower vessel by means of a spout without the interposition of a funnel or pipe. The stepped series of evaporating vessels above mentioned are set in a long rectangular structure, in which the vessels are exposed to the heated gases of combustion from a fire or furnace or the combustion of producer or water gas, while the upper surface of the liquid in the vessels communicates with the upper part of the rectangular structure, which sometimes forms an outlet-flue for conveying away the acid aqueous vapor produced during evaporation. In this way the weaker acid or liquid fed into the upper vessel of the series of evaporating vessels is gradually concentrated in its passage from one vessel of the series to the other in the manner described, so that concentrated acid is delivered from the lowest vessel of such series.

In some forms of the apparatus above described the whole of the exterior surfaces of the vessels, together with the upper surfaces of the liquid in such vessels, are kept in contact with the gases of combustion, so as to materially assist the concentration by the surface evaporation of the exposed liquid, and in some cases the evaporation vessels are placed or carried in sand-baths placed within the rectangular structure in a manner well known and understood.

The evaporating apparatus above described, however, have certain material disadvantages, which it is the object of this my invention to obviate. Among these I may mention that such form of apparatus is expensive to construct and maintain, and it occupies a considerable space. The brickwork soon cracks through the great heat, the caloric effect of the apparatus becomes unequal, and its structure loses stability. Since as a rule the heated gases used for effecting evaporation are introduced at the lowest part of the apparatus, they have to pass through a long flue, whereby their temperature is considerably lowered. Access to the evaporating vessels in case of fracture (an occurrence by no means uncommon) is difficult, and when such fracture occurs the replacement of the fractured vessel is difficult and inconvenient and occupies a considerable time, during which the whole process of concentration must be stopped, thereby occasioning great loss of time. Besides this there is no means of quickly and readily locating the position of the fractured vessel, which involves both a loss of acid and time, and by reason of the large body of fumes given off renders the subsequent replacement of the broken vessel more difficult and inconvenient. Also when gaseous fuel is employed the air required for its combustion is introduced into the apparatus in a cold state, which not only detracts from the caloric efficiency, but is a fruitful cause of the breakage of the vessels, which, as before mentioned, gives rise to great loss in time and material.

My improvement consists in arranging a series of glass, porcelain, or other evaporating vessels one above the other inside a vertical tower of circular, square, or other convenient section, such tower being made of iron or other refractory material, each vessel resting on a horizontal tray or shelf, the series of vessels being so placed as to form a spiral, the axis of which coincides with that of the tower. Each of the trays, which carry or support the vessels, projects into the interior of the tower, and each of such parts of the shell of the tower is carried by a hinge or swivel formed on a fixed portion of the tower, thus constituting a movable or swiveling door, so that by opening such swiveling door the evaporating vessel, which is carried upon the tray fixed thereto, can be at once withdrawn from the tower. It is obvious that such a construction admits of a large number of evaporating vessels being arranged spirally one above the other to deliver the acid or liquid undergoing evaporation from one to the other in a small space, and that the larger the tower is in cross-section the greater the number of evaporating vessels which can be placed inside it. The top of the tower may be closed by a slab of stone or other refractory material and may carry a tank or other vessel, from which the dilute acid may be fed to the first of the series of the evaporating vessels inside the tower, and thus the acid or liquid in passing from one evaporating vessel to the other will traverse a path of considerable length. The trays which carry the evaporating vessels may be arranged to communicate by means of a hole, tube, or small opening with a vertical channel formed on a fixed portion of the exterior of the tower, so that leakage from any broken or cracked vessel may at once become apparent and so be easily and quickly located. The top of the tower must be provided with an outlet pipe or flue, so as to convey the heated gases of combustion employed for the purpose of evaporation, together with the aqueous products of evaporation, to a suitable condenser or other receptacle or into the open air. The lower part of the tower is secured to a suitable foundation and provided with appropriate means and apparatus for the admission and control of the heated gases used to effect the evaporation. The source of heat furnishing such gases may be an ordinary coke or coal fire, the products of combustion from which are conveyed through the tower; but I prefer to use producer or water gas, the combustion of which will give a less carbonaceous deposit, in the manner which is well known and understood, in heating or evaporating.

For the reasons before mentioned the air required for the combustion of the producer or water gas, when such is employed, may with advantage undergo a preliminary heating by the waste heat from the apparatus itself. This can be accomplished by leaving an air-space between the plate on the top of the tower and the tank for the dilute acid, before described, which air-space communicates with the outer air through suitable openings and also with the columns forming the tower, which for this purpose are cast hollow. The columns are connected with channels formed in the foundation of the tower and communicate with a circular or annular channel or flue, formed either by a suitable iron casting, or by brickwork, or partly by iron and partly by brickwork. Through the inner wall of the annular flue the gases of combustion are carried into the apparatus, so that when the said inner wall becomes heated by the burning gases the air circulating around the annular flue is heated by contact therewith. The heated air issues from such annular flue through a channel and pipe and is conveyed away under the grate or burner. If required, cold air can be admitted direct to the annular heating-flue through damper-controlled openings.

A suitable form of apparatus for carrying my invention into effect is shown on the accompanying drawings, wherein—

Figure 3:
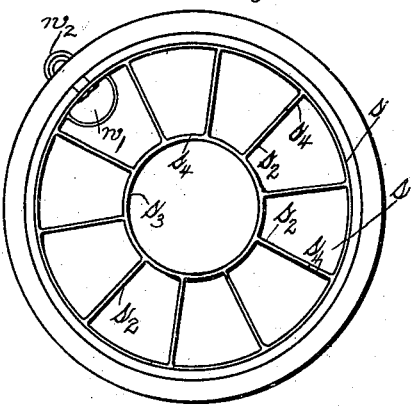
Figure 8:
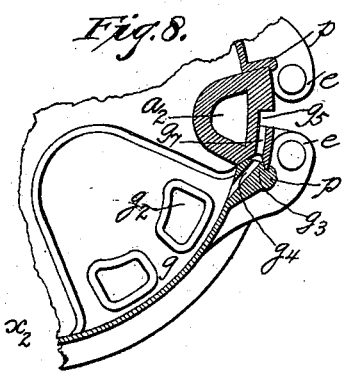

Figure 1 represents an outside view of the tower; Fig. 2, a vertical section thereof on line A B of Fig. 4; Fig. 3, a plan of the top tank for the dilute acid; Fig. 4, a horizontal section of the tower; Fig. 5, a vertical section through the concentrated-acid outlet; Figs. 6 and 7, a plan and section, respectively, of an alternative system of vessels. Fig. 8 is a sectional detail view drawn to an enlarged scale and showing the arrangement of channels for leading liquid from the trays to the outside of the tower.

The apparatus consists of two hollow cast-iron vertical carrying pillars or columns $a_1$ and $a_2$ and two hollow cast-iron fixing pillars or columns $a_3$ $a_4$, both of suitable section, securely fixed below to a cast-iron ring $b$ and held in place at the top by a cast-iron ring $c$, the whole resting on a brick, stone, or iron foundation $d$. To the carrying-pillars hinges $e$ are fixed, which carry cast-iron swiveling-doors $f'$, having fixed to or cast in one with them horizontal cast-iron trays $g$, each provided with a raised external rim $h$ and a slightly conical or inclined lower surface. These trays carry, standing freely thereon or in an iron pot $i$, with or without a layer of sand $j$, the glass or porcelain evaporating vessels $k$, and the doors and trays, together with some smaller doors $f_2$ without trays, made to fill up vacant spaces, are so arranged and placed that when they are securely closed and fastened by catches $m$ a tower, as above mentioned and described, is formed with the evaporating vessels one above the other and arranged spirally, so as to be capable of delivering the acid or liquid under treatment from the top of the tower to the bottom, from vessel to vessel in succession. Each of the evaporating vessels is provided with a spout $n$, delivering the liquid overflowing therefrom into a flat-shaped funnel $o'$, resting on the vessel next below, and a pipe $o_2$ from such flat-shaped funnel conveys the liquid to the lower part of the vessel upon which it rests, while lugs $o_3$ keep the funnel in its place. To this end each funnel has on the under side of its more or less flat head two lugs $o_3$, one of said lugs bearing on the inner face of the vessel $k$ and the other on its outer face, as clearly shown on the funnel for the upper vessel $k$, Fig. 2. If the vessel has a dividing-partition, as in Figs. 6 and 7, then the liquid flows into the compartment $o_4$, passes through the compartment $o_5$, and runs over through the spout $n$ without the use of the funnel and pipe above mentioned. Each of the cast-iron trays carrying the evaporating vessels is provided with openings $g_2$ likewise encompassed by an upturned flange for the better distribution of the heat throughout the apparatus. The gates or doors $f$, which carry these trays, have at the point where they are hinged to the pillars $a_1 a_2$ a conical enlargement $g_3$, in which is formed a passage $g_4$ in the plane of and leading to the upper face of the tray thereon. The aforesaid conical enlargement $g_3$ fits into a corresponding recess in the said pillars $a_1 a_2$, which recess communicates through a passage $g_7$ either with a down-spout or with a vertical channel $g_5$, formed in the outer face of the pillars between the gate-hinges, said vertical passage discharging at its lower end into a corresponding channel $g_6$, formed in the conical base-ring $b$. (See Figs. 2 and 8.) By means of the described arrangement of channels acid escaping from a broken vessel is conducted to the outside of the tower, whereby the leaking vessel can be readily located.

By the means above described a fractured or overflowing vessel may be readily located, and the conical or inclined under surface of the tray, before mentioned, serves to carry away any moisture which may condense thereon.

When the evaporating vessels are placed in iron pots on the trays with or without sand, such pots are provided, as shown in Fig. 5, with a small hole $l$, so as to allow the acid escaping from the fractured evaporating vessel to run out gradually on the tray and to be carried to the exterior of the tower, as before described. Each of the doors of the tower abuts the one against the other and against the pillars by means of angular surfaces $p$, so as to prevent the escape of fumes, and the horizontal joints of the doors may be luted in the usual manner, so as to more effectually prevent the escape of the acid fumes, and this may be also further promoted by an exhauster or chimney-shaft placed at the end of the outlet-pipe $v^2$, which carries off the fumes in any well-known manner. The interior of the doors forming the tower in the manner described may be enameled or covered or lined with fire-bricks, asbestos, or other acid-resisting materials or painted with acid-proof paint. The exterior of the doors forming the tower, as well as such other exposed parts thereof, may with advantage be covered with some non-conducting material—e. g., kieselguhr—so as to minimize radiation and consequent loss of heat.

The top ring $c$ carries a cast-iron tank $r$, in which either a number of lead or porcelain vessels connected in the usual way are placed or in which a lead tank $s$ stands, such tank having a number of radial partitions $s_2$ radiating from a central circular compartment $s_3$. Each of the divisions so formed is connected alternately at the top and bottom by means of holes or openings $s_4$, so as to cause the liquid entering the first of such divisions from the central ring to run in a zigzag line and up and down through the whole of the divisions successively. The acid enters the center of this tank through a funnel $t$, and in its circuitous path through the leaden tank is preheated by the hot gases of the apparatus before they issue through the outlet-pipe $u$, Fig. 1, in the upper part of the tower. The tank is closed by means of a cover $v_1$, and a fume-pipe $v^2$ leads to the outside. The liquid from the last compartment or lead vessel in the tank is either delivered into the first of the series of evaporating vessels inside the tower by means of a pipe passing through the cover-plate $g$ or it is conveyed from the tank by means of a funnel-pipe $w_1$ into the first evaporating vessel through a feed-funnel $w_2$, Figs. 2 and 3.

If the products of combustion of a coal or coke furnace are used for heating the apparatus, they are introduced directly into the lower ring of the tower; but if producer or water gas is used it is admitted through a valved pipe $x_1$, and at the same time air is admitted through a valved pipe $x_2$, and the two enter the mixing-chamber $y_1$, whence the mixture is brought through two perforated plates $y_2$ and $y_3$, of iron, stone, or other suitable material, and through a finely-perforated burner-plate $y_4$, where the combustible mixture is lighted and consumed. The holes in the plates $y_2$ and $y_3$ do not face each other, so as to obtain better mixing of the air and gas. In order to make the combustion more effective and to prevent the cold air injuring the concentrating vessels, the top ring $c$ is made high enough to allow a space $q_2$ to be formed between a plate $q$ and the tank $r$, said plate $q$, as shown in Fig. 2, being preferably cast with said tank. This space $q_2$ communicates with the outer air through slots or holes $c_2$ and by means of openings $c_3$. It also communicates with the hollow space down the center of each of the pillars of the tower and with the bottom ring $b$ through corresponding openings $b_2$, which lead to channels $b_3$, formed in the brickwork. The burner-plate $y_4$ is carried by a circular conical casting $y_5$, which is made hollow or so shaped that when the brickwork of the foundation is built up to it a channel or annular flue $b_4$ is formed, with which the small flues $b_3$, coming from the columns, communicate. It is obvious that the air coming in at the top of the tower is preheated by passing over the top plate $q$ and through the pillars and is finally strongly heated by means of the heat radiating from the gas-burner through the annular flue or passage $b_4$.

Should it be found necessary to admit air direct to the interior of the tower, this can be readily effected through a damper-controlled opening $b_5$, which communicates, by means of another small flue, with the annular flue $b_4$. From the flue $b_4$ a channel fitted with an iron pipe $b_6$ conveys the heated air through the valved pipe $x_2$ and through the pipe $x_3$ into the mixing-chamber $y_1$.

The concentrated acid or liquid from the lowest evaporating vessel within the tower is discharged through a luted opening $z_1$ in the door carrying such vessel upon the tray fixed thereto into a cooler of suitable construction, and in such opening $z_1$ the thermometer and hydrometer $z_2$ requisite to observe the temperature and strength of the concentrated acid or liquid may be placed.

Having now particularly described and ascertained the nature of my said invention and in what manner the same is to be performed, I declare that what I claim is—

1. An apparatus such as described comprising a closed upright structure having doors each provided with an inwardly-projecting shelf or tray arranged to form within said structure spirally-disposed steps, means at the foot of said structure for heating it internally and means at the head thereof for educting the vapors and products of combustion, for the purpose set forth.

2. An apparatus such as described comprising a closed upright structure the body of which is composed of four columns and doors arranged in a spiral plane and having hinge connection with and closing upon said columns, each of said doors provided with an inwardly-projecting shelf or tray to form within said structure spirally-disposed steps, means at the foot of the structure for heating it internally and means at the head thereof for educting the vapors and products of combustion, for the purpose set forth.

3. An apparatus such as described comprising a closed upright structure, having doors each provided with an inwardly-projecting shelf arranged to form within the structure spirally-disposed steps, each of said shelves having an upwardly-projecting encompassing flange, a passage leading from the surface of each shelf to the outside of the structure, means at the foot of the latter for heating it internally and means at the head thereof for educting the vapors and products of combustion, for the purpose set forth.

4. An apparatus such as described comprising a closed upright structure having doors each provided with an inwardly-projecting shelf or tray arranged to form within said structure spirally-disposed steps, said shelves or trays having an opening therein, and upwardly-projecting flanges encompassing the shelves and their openings, a passage leading from the surface of each shelf to the outside of the structure, means at the foot of the latter for heating it internally and means at the head thereof for educting the vapors and products of combustion, for the purpose set forth.

5. An apparatus such as described comprising a closed upright structure having doors each provided with an inwardly-projecting shelf or tray of the form of a truncated sector arranged to form within said structure spirally-disposed steps and an axial clear space, means at the foot of the structure for heating it internally and means at the head thereof for educting the vapors and products of combustion, for the purpose set forth.

6. An apparatus such as described comprising a closed upright structure the body of which is made up of four hollow columns and doors arranged in spiral plane and having hinge connection with and closing upon said columns, each of said doors provided with an inwardly-projecting shelf or tray to form within the structure spirally-disposed steps, an air-chamber above said columns in communication therewith, means for admitting air to said chamber, a combustion-chamber at the foot of the structure in communication with the lower end of the aforesaid hollow columns, and means at the head of the structure for educting the vapors and products of combustion, for the purpose set forth.

7. An apparatus such as described comprising a closed upright structure the body of which is made up of four columns each provided with an external longitudinal channel and doors arranged in a spiral plane and having hinge connection with and closing upon said columns, each of said doors provided with an inwardly-projecting shelf or tray having an upwardly-extending encompassing flange, the surface of said shelf communicating with the external longitudinal channel in the column to which the door of said shelf is hinged, means at the foot of the structure for heating it externally, and means at the head thereof for educting the vapors and products of combustion, for the purpose set forth.

8. An apparatus such as described comprising a closed upright structure having doors arranged spirally and provided each with an inwardly-projecting shelf or tray to form within said structure spirally-disposed steps, an evaporating vessel on each of said shelves arranged to overflow from one into the other, means for feeding a liquid to the vessel on the uppermost shelf, means for discharging the liquid from the lowermost vessel, means at the foot of the structure for heating it internally and means at the head thereof for educting the vapors and products of combustion, for the purpose set forth.

9. An apparatus such as described, comprising a closed upright structure having doors arranged spirally and provided each with an inwardly-projecting shelf to form within the structure spirally-disposed steps, an evaporating vessel on each of said shelves arranged to overflow one into another, means for feeding a liquid to the uppermost vessel, a liquid-sealed discharge outside the structure for the lowermost vessel, means at the foot of said structure for heating it internally and means at the head thereof for educting the vapors and products of combustion, for the purpose set forth.

10. An apparatus such as described comprising a closed upright structure having spirally-arranged doors each provided with an inwardly-projecting shelf having an upwardly-projecting encompassing flange, vertical external channels in communication with the surface of the shelves and a base-ring in which the structure is stepped having the form of a truncated cone and provided with external channels registering with the aforesaid vertical channels, in combination with means below said base-ring for heating the structure internally and means at the head thereof for educting the vapors and products of combustion for the purpose set forth.

11. In a concentrating apparatus, the combination with an upright closed vessel, of a burner consisting of an inverted hollow cone, and a perforated plate in the narrower end thereof arranged at the foot of the structure, perforated plates $y^2$ $y^3$ below the burner arranged one above the other to form a space between them and between the upper plate and the burner, means for supplying a combustible fluid below the plates $y^2$ $y^3$, means for admitting air into the space between the upper plate $y^3$ and said burner, and means at the head of the structure for educting the vapors and products of combustion, for the purpose set forth.

12. In a concentrating apparatus, the combination with an upright closed structure the body of which is made up of hollow columns and doors arranged in a spiral plane having hinge connection with and closing upon said columns, each of said doors provided with an inwardly-projecting shelf to form within the structure spirally-disposed steps, and an air-chamber at the head of said columns in communication therewith; of a burner at the foot of the columns consisting of a hollow inverted truncated cone having a perforated plate in its narrower end, a mixing-chamber below said burner in communication with the hollow columns, means for feeding a combustible fluid to the mixing-chamber, means for breaking up said fuel into jets before it reaches said mixing-chamber, and means at the head of the structure for educting vapors and the products of combustion, for the purpose set forth.

13. Apparatus such as described comprising a closed upright structure having doors arranged in a spiral plane each provided with an inwardly-projecting shelf to form within said structure spirally-disposed steps, an evaporating vessel on each of said shelves provided with a funnel having a tubular extension dipping into such vessel, said vessels having an overflow-spout and being arranged so that the liquid flowing from the spout of one vessel will flow into the funnel of the vessel next below, means for feeding a liquid to the uppermost vessel, and means for discharging the liquid from the lowermost vessel; in combination with means at the foot of the structure for heating it internally and means at the head thereof for educting the vapors and products of combustion, for the purpose set forth.

14. Apparatus such as described comprising a closed upright structure having doors arranged in a spiral plane and provided each with an inwardly-projecting shelf to form within said structure spirally-disposed steps, and an evaporating vessel on each of said shelves arranged to overflow one into another; in combination with a feed-tank on top of the structure having a central receiving-chamber and a series of chambers disposed about said receiving-chamber, the latter communicating with one of the outer chambers and said outer chambers communicating with one another alternately at top and bottom, a feed-duct extending from the last of the series of outer chambers arranged to discharge into the vessel on the uppermost shelf, means at the foot of the structure for heating it internally, and means at the head thereof for educting the vapors and products of combustion, for the purpose set forth.

15. Apparatus such as described, comprising a closed upright structure the body of which is made up of hollow columns and doors arranged in a spiral plane and having hinge connection with and closing upon said columns, an evaporating vessel on each of said shelves arranged to overflow one into the other and an air-chamber at the head and foot of said columns; in combination with a gaseous-fuel burner, a mixing-chamber below said burner in communication with the air-chamber at the foot of the hollow columns, means for admitting air to the chamber at the head of said columns, means at the head of the structure for educting vapors and products of combustion therefrom, a feed-tank above the upper air-chamber having a plurality of chambers disposed about a central receiving-chamber which latter is in communication with one of the outer chambers and said outer chambers communicating with one another alternately at top and bottom, and a feed-duct for the last of the series of chambers arranged to discharge into the vessel on the upper shelf of the series of such, for the purpose set forth.

In testimony that I claim the foregoing as my invention I have signed my name in presence of two subscribing witnesses.

OSCAR GUTTMANN.

Witnesses:
J. W. HINCHLEY,
LUDWIG REISCHER.